Feb. 15, 1938.  C. C. PARRISH  2,108,388
MOTOR POWERING SYSTEM
Filed Dec. 31, 1936
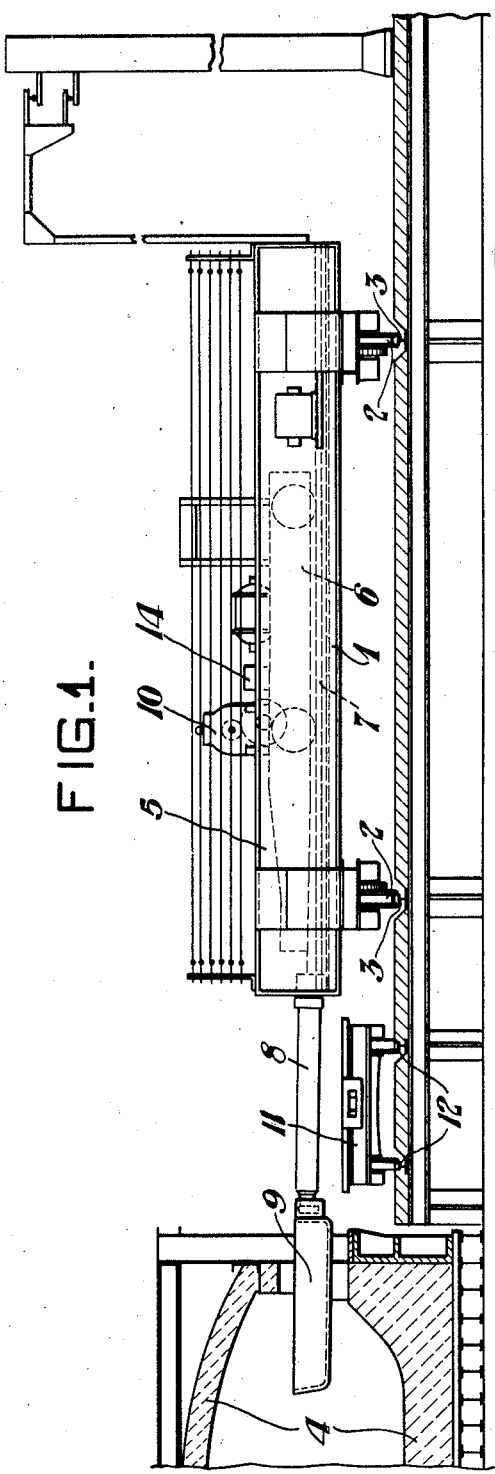
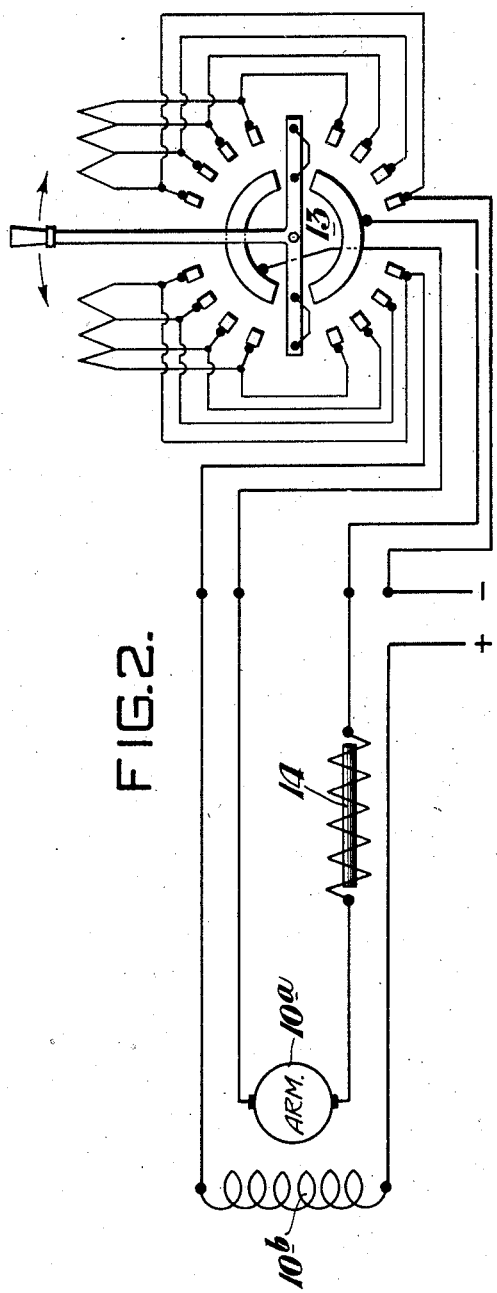
INVENTOR.
CECIL C. PARRISH,
BY
HIS ATTORNEYS.

UNITED STATES PATENT OFFICE 2,108,388

MOTOR POWERING SYSTEM

Cecil C. Parrish, Donora, Pa., assignor to The American Steel and Wire Company of New Jersey, a corporation of New Jersey Application December 31, 1936, Serial No. 118,673

1 Claim. (Cl. 172—239)

This invention relates in general to power systems for electric motors, but it is particularly concerned with a system for powering a direct-current series-wound electric motor driving heavy apparatus whose control requires rapid starting, stopping and reversing.

The accompanying drawing includes two figures, Figure 1 being a side view of an open-hearth charging machine whose trolley motion motor is of the type mentioned, while Figure 2 is a diagram of a powering system for this motor embodying the principles of the invention.

A charging machine consists essentially of a bottom truck 1 made up of a very strong framework and mounted on flanged wheels 2 which travel on a very wide gage track 3 laid in front of the open-hearth 4. Next there is a charging carriage 5 carried by wheels 6 which ride on a track 7 laid on the frame of the truck at right angles to the motion of the truck itself. On this carriage is mounted a kind of a lever 8, the long arm of which extends towards the furnace and is known as the "charging-bar". Through a suitable arrangement this charging bar can pick up a charging box 9, carry it into the furnace 4, and rotate it so as to dump the charge.

Now it will be observed that all the moving parts of this charging machine are very massive and heavy. The operator of the machine is usually of a rough-and-ready temperament. If this temperament is not inherent in the individual it is soon acquired due to the conditions under which he works. In any event, it is necessary for the furnace to be charged with as much dispatch as possible, so that in all cases the charging machine is roughly handled at a great rate of speed in spite of the weight involved.

The carriage 5 of the machine receives its necessary reciprocation by way of a direct-current series-wound electric motor 10 that is geared to the wheels 6. The operator must control this motor so as to rapidly move the charging box 9 into the furnace 4, stop it, and, after dumping, remove it rapidly from the furnace and again stop it over the charging buggy 11 which, although not previously mentioned, runs on narrow gage tracks 12 laid between the furnace and the tracks 3, parallel with the latter. The mass of the parts moved and the speed of movement are such that commercial forms of brakes cannot provide the rapid stopping required. Therefore, the operator of a charging machine relies entirely upon the motor 10, resorting to what is commonly known as "plugging". This operation simply consists in reversing the current through the motor 10 while the carriage 5, charging bar 8 and charging box 9 are still moving. Such procedure is common practice.

Those in charge of the maintenance of open-hearth machines know that the armatures of the charging machine carriage motors have an extremely short service life. It is usual to replace the armatures at least several times a week. This involves expense, which is not only due to the cost of rewinding the armatures but also because the charging machine is put out of operation for about two hours.

To those engaged in the maintenance of electrical equipment of what might be called a more refined character, the described procedure may seem senseless. However, long years of experience have shown that the only possible way to control the trolley movement of an open hearth charging machine is by "plugging" its motors. So it may be expected that this practice will prevail until some suitable form of controlling equipment is developed.

Referring now to Figure 2, the armature $10^a$ and the field $10^b$ of the motor 10 are shown connected to a conventional manual reversing controller 13 in what is a conventional manner, except that a reactor 14 is inserted in the armature circuit. This reactor consists of a number of turns of wire about a suitable iron core. It is essentially a choke coil, and is constructed in a well known manner to provide sufficient reactance in the armature circuit of the motor to retard current surges through the same of such magnitude as to prevent the armature having what may be considered a reasonable service life. The simplicity of the arrangement or system is evident. A reactor of sufficient size may be easily mounted on the trolley 6 of the open-hearth charging machine, Figure 1 showing it as it appears in an actual installation.

An open-hearth charging machine having its direct-current series-wound trolley motor provided with such a reactor arranged in circuit with its armature has been in every-day operation for some time. Records show that the life of its armature has been prolonged to a period of months as contrasted to a service period of days which is considered quite normal in other open-hearth departments. It might seem that the provision of a choke-coil or reactor of the armature circuit in the trolley motor should have been thought of long ago. However, the actual fact is that in spite of repeated appeals to the various electrical manufacturing companies to remedy what is obviously a bad situation, the earlier disclosed solution was never provided. The idea embodied by the present invention has been discussed by electrical engineers to a considerable extent and it is conceded by them to be a great contribution to the art.

Although the invention has been disclosed in conjunction with an open-hearth charging machine, the principles involved are applicable wherever relatively heavy machinery must be quickly handled. Thus, it will prove of advantage in conjunction with cranes, hoists, and the bridge motors of open-hearth charging machines.

I claim:

A powering system for a direct-current series-wound electric motor driving heavy apparatus whose control requires rapid starting, stopping and reversing, said system including a reversing circuit for said motor permitting heavy overloading of the same to provide said control by reversing the current through said motor as required to effect the same, said circuit being characterized in that it includes a conventional reversing controller connected by way of said circuit to control said motor and being characterized in that excessive current surges through said motor during rapid starting, stopping and reversing are prevented solely by means of a reactor inserted in the armature circuit of said motor and providing sufficient reactance to perform said function, whereby to eliminate the need for automatic acceleration switches and the like.

CECIL C. PARRISH.